United States Patent
Liu et al.

(10) Patent No.: US 11,044,211 B2
(45) Date of Patent: *Jun. 22, 2021

(54) MULTICAST PACKET HANDLING BASED ON CONTROL INFORMATION IN SOFTWARE-DEFINED NETWORKING (SDN) ENVIRONMENT

(71) Applicant: Nicira, Inc., Palo Alto, CA (US)

(72) Inventors: Wenfeng Liu, Beijing (CN); Hua Wang, Beijing (CN); Jingchun Jiang, Beijing (CN); Donghai Han, Beijing (CN); Jianjun Shen, Redwood City, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,008

(22) Filed: Dec. 13, 2019

(65) Prior Publication Data

US 2020/0195579 A1 Jun. 18, 2020

Related U.S. Application Data

(63) Continuation of application No. 15/630,933, filed on Jun. 22, 2017, now Pat. No. 10,511,548.

(51) Int. Cl.
*H04L 12/931* (2013.01)
*H04L 12/18* (2006.01)
*H04L 12/761* (2013.01)

(52) U.S. Cl.
CPC ........ *H04L 49/201* (2013.01); *H04L 12/1886* (2013.01); *H04L 45/16* (2013.01)

(58) Field of Classification Search
CPC ..................................................... H04L 49/201
See application file for complete search history.

(56) References Cited

U.S. PATENT DOCUMENTS

| | | | |
|---|---|---|---|
| 8,576,844 B1 * | 11/2013 | Ghosh | H04L 12/1886 370/390 |
| 9,014,007 B2 * | 4/2015 | Bhikkaji | H04L 47/125 370/237 |
| 9,130,859 B1 * | 9/2015 | Knappe | H04L 12/4641 |
| 9,325,636 B2 * | 4/2016 | Yang | H04L 12/18 |
| 9,432,204 B2 | 8/2016 | Shen et al. | |
| 9,736,054 B2 * | 8/2017 | Bacthu | H04L 45/16 |

(Continued)

*Primary Examiner* — Parth Patel
(74) *Attorney, Agent, or Firm* — SU IP Consutling

(57) ABSTRACT

Example methods are provided for first host to perform multicast packet handling in a software-defined networking (SDN) environment. The method may comprise: in response to the first host detecting, from a first virtualized computing instance, a request to join a multicast group address, obtaining control information from a network management entity. The control information may include one or more destination addresses associated with one or more second hosts that have joined the multicast group address on behalf of multiple second virtualized computing instances. The method may also comprise: in response to the first host detecting an egress multicast packet that includes an inner header addressed to the multicast group address, generating one or more encapsulated multicast packets based on the control information and sending the one or more encapsulated multicast packets in a unicast manner or multicast manner, or a combination of both.

21 Claims, 11 Drawing Sheets

(56) References Cited

U.S. PATENT DOCUMENTS

| | | | |
|---|---|---|---|
| 9,787,488 B1* | 10/2017 | Rainovic | H04L 47/70 |
| 9,794,079 B2* | 10/2017 | Tessmer | H04L 12/18 |
| 9,806,896 B2 | 10/2017 | Xiang et al. | |
| 10,511,548 B2* | 12/2019 | Liu | H04L 45/16 |
| 2003/0231629 A1* | 12/2003 | Banerjee | H04L 12/1859 370/390 |
| 2005/0138369 A1* | 6/2005 | Lebovitz | H04L 63/08 713/163 |
| 2007/0104192 A1* | 5/2007 | Yoon | H04L 12/4641 370/389 |
| 2007/0183418 A1* | 8/2007 | Riddoch | H04L 49/90 370/389 |
| 2007/0217416 A1* | 9/2007 | Okuda | H04L 45/00 370/390 |
| 2012/0281697 A1* | 11/2012 | Huang | H04L 12/1886 370/390 |
| 2013/0010790 A1* | 1/2013 | Shao | H04L 45/16 370/390 |
| 2013/0259042 A1* | 10/2013 | Song | H04L 45/16 370/390 |
| 2013/0322443 A1* | 12/2013 | Dunbar | H04L 12/185 370/390 |
| 2014/0092902 A1* | 4/2014 | Yang | H04L 12/1886 370/390 |
| 2014/0123211 A1* | 5/2014 | Wanser | H04L 63/10 726/1 |
| 2014/0192804 A1* | 7/2014 | Ghanwani | H04L 12/18 370/390 |
| 2014/0226531 A1* | 8/2014 | Farkas | H04L 12/1836 370/256 |
| 2014/0233563 A1* | 8/2014 | Chen | H04L 12/18 370/390 |
| 2014/0269415 A1* | 9/2014 | Banavalikar | H04L 45/24 370/254 |
| 2015/0103679 A1* | 4/2015 | Tessmer | H04L 43/50 370/252 |
| 2015/0223030 A1* | 8/2015 | Gu | H04L 12/189 370/312 |
| 2015/0236871 A1* | 8/2015 | Kang | H04L 12/18 370/390 |
| 2015/0256576 A1* | 9/2015 | Yang | H04L 65/4076 370/390 |
| 2016/0094353 A1* | 3/2016 | Sreeramoju | H04L 12/185 370/390 |
| 2016/0285641 A1* | 9/2016 | He | H04L 45/16 |
| 2016/0330125 A1* | 11/2016 | Mekkattuparamban | H04L 12/4633 |
| 2016/0337423 A1* | 11/2016 | Uchida | H04L 45/74 |
| 2017/0048076 A1* | 2/2017 | Li | H04L 12/185 |
| 2017/0187608 A1* | 6/2017 | Nevrekar | H04L 45/16 |
| 2017/0302464 A1* | 10/2017 | Hu | H04L 12/185 |
| 2018/0102965 A1* | 4/2018 | Hari | H04L 45/74 |
| 2018/0191515 A1* | 7/2018 | Vivekanandan | H04L 12/4641 |
| 2018/0212788 A1* | 7/2018 | Iszlai | H04L 12/4641 |
| 2018/0270146 A1* | 9/2018 | Jiang | H04L 69/22 |
| 2018/0375799 A1 | 12/2018 | Liu et al. | |

* cited by examiner

Multicast group table at SDN controller 430

| VNI | IP-M | IP-G | Members |
|---|---|---|---|
| 5001 | 239.1.1.1 | 224.1.1.1 | IP-C, IP-D, IP-A |

Multicast group table at Host-C 445

| VNI | IP-M | IP-G | DVTEP IP |
|---|---|---|---|
| 5001 | 239.1.1.1 | 224.1.1.1 | IP-D, IP-A |

Multicast group table at Host-D 455

| VNI | IP-M | IP-G | DVTEP IP |
|---|---|---|---|
| 5001 | 239.1.1.1 | 224.1.1.1 | IP-C, IP-A |

Multicast group table at Host-A 465

| VNI | IP-M | IP-G | DVTEP IP |
|---|---|---|---|
| 5001 | 239.1.1.1 | 224.1.1.1 | IP-C, IP-D |

Multicast group table at multicast-enabled network device 475

| IP-G | (Source address, Port ID) |
|---|---|
| 224.1.1.1 | (IP-C, P1), (IP-D, P2), (IP-A, P3) |

…

MULTICAST PACKET HANDLING BASED ON CONTROL INFORMATION IN SOFTWARE-DEFINED NETWORKING (SDN) ENVIRONMENT

CROSS-REFERENCE TO RELATED APPLICATION

This application is a continuation under 35 U.S.C. § 120 of U.S. patent application Ser. No. 15/630,933, filed Jun. 22, 2017, which is incorporated by reference in its entirety.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Through SDN, benefits similar to server virtualization may be derived for networking services. For example, logical overlay networks that are decoupled from the underlying physical network infrastructure may be provided. The logical overlay networks may be provisioned, changed, stored, deleted and restored programmatically without having to reconfigure the underlying physical hardware architecture, thereby improving network utilization and facilitating configuration automation. In practice, multicasting may be implemented in an SDN environment to support the distribution of information from one or more sources to a group of destinations simultaneously. However, multicast packets are generally treated as unknown unicast packets or broadcast packets in an SDN environment, which is inefficient and undesirable.

DETAILED DESCRIPTION

Figure 1:
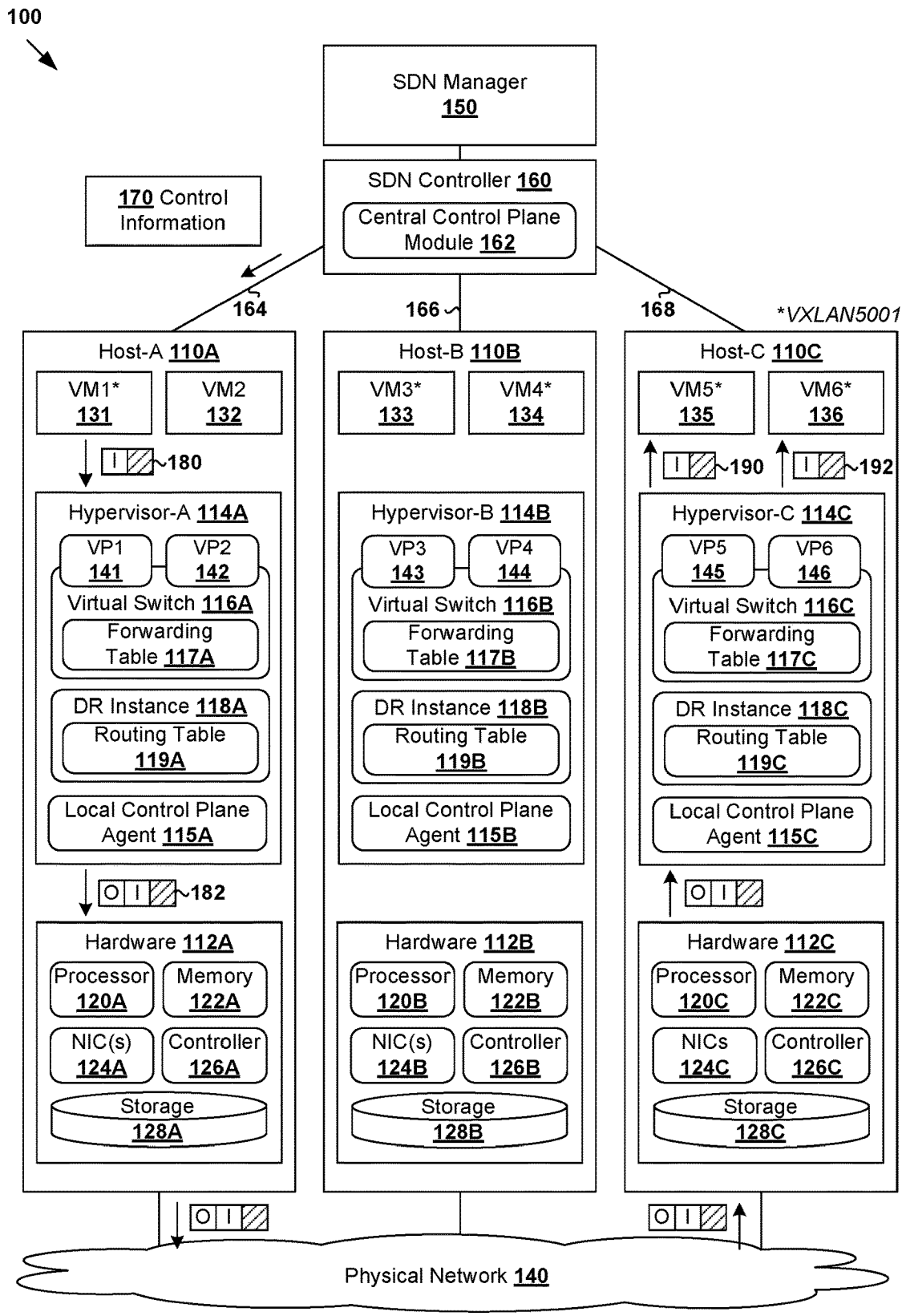
FIG. 1 is a schematic diagram illustrating an example software-defined networking (SDN) environment in which multicast packet handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to multicast packet handling will now be explained in more detail using FIG. 1, which is a schematic diagram illustrating example software-defined networking (SDN) environment 100 in which multicast packet handling may be performed. It should be understood that, depending on the desired implementation, SDN environment 100 may include additional and/or alternative components than that shown in FIG. 1.

In the example in FIG. 1, SDN environment 100 includes multiple hosts, such as host-A 110A, host-B 110B and host-C 110C that are inter-connected via physical network 140. Each host 110A/110B/110C includes suitable hardware 112A/112B/112C and virtualization software (e.g., hypervisor-A 114A, hypervisor-B 114B, hypervisor-C 114C) to support various virtual machines. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "computing devices", "host computers", "host devices", "physical servers", "server systems", etc.), where each host may be supporting tens or hundreds of virtual machines.

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system. The term "hypervisor" may refer generally to a software layer or component that supports the execution of multiple virtualized computing instances, including system-level software in guest virtual machines that supports namespace containers, etc.

Hypervisor 114A/114B/114C maintains a mapping between underlying hardware 112A/112B/112C and virtual resources allocated to virtual machines 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications. For example, corresponding to hardware 112A/112B/112C, the virtual resources may include virtual CPU, virtual memory, virtual disk, virtual network interface controller (VNIC), etc.

Hypervisor 114A/114B/114C further implements virtual switch 116A/116B/116C and logical distributed router (DR) instance 118A/118B/118C to handle egress packets from, and ingress packets to, corresponding virtual machines 131-136. In practice, logical switches and logical distributed routers may be implemented in a distributed manner and can span multiple hosts to connect virtual machines 131-136. For example, logical switches that provide logical layer-2 connectivity may be implemented collectively by virtual switches 116A-C and represented internally using forwarding tables 117A-C at respective virtual switches 116A-C. Forwarding tables 117A-C may each include entries that collectively implement the respective logical switches. Further, logical distributed routers that provide logical layer-3 connectivity may be implemented collectively by DR instances 118A-C and represented internally using routing tables 119A-C at respective DR instances 118A-C. Routing tables 119A-C may be each include entries that collectively implement the respective logical distributed routers.

Virtual switch 116A/116B/116C also maintains forwarding information to forward packets to and from corresponding virtual machines 131-136. Packets are received from, or sent to, each virtual machine via an associated virtual port. For example, virtual ports VP1 141 and VP2 142 are associated with respective VM1 131 and VM2 132 at host-A 110A, VP3 143 and VP4 144 with respective VM3 133 and VM4 134 at host-B 110B, and VP5 145 and VP6 146 with respective VM5 135 and VM6 136 at host-C 110C. As used herein, the term "packet" may refer generally to a group of bits that can be transported together from a source to a destination, such as message, segment, datagram, etc. The term "layer-2" may refer generally to a Media Access Control (MAC) layer; "layer-3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

SDN manager 150 and SDN controller 160 are example network management entities that facilitate implementation of software-defined (e.g., logical overlay) networks SDN environment 100. One example of an SDN controller is the NSX controller component of VMware NSX® (available from VMware, Inc.) that operates on a central control plane (also referred as "control plane"). SDN controller 160 may be a member of a controller cluster (not shown for simplicity) that is configurable using SDN manager 150 operating on a management plane. Network management entity 150/160 may be implemented using physical machine(s), virtual machine(s), or both.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1 (see asterisks), VM1 131 on host-A 110A, VM3 133 and VM4 134 on host-B 110B, as well as VM5 135 and VM6 136 on host-C 110C are located on the same logical layer-2 segment, i.e., VXLAN segment with VXLAN network identifier (VNI)=5001. Note that the terms "logical overlay network" and "logical layer-2 segment" may be used interchangeably to refer generally to a logical layer-2 domain created in SDN environment 100.

Each host 110A/110B/110C maintains data-plane connectivity with other host(s) to facilitate communication among virtual machines located on the same logical overlay network. In particular, hypervisor 114A/114B/114C implements a virtual tunnel endpoint (VTEP) to encapsulate and decapsulate packets with an outer header (also known as a tunnel header) identifying the relevant logical overlay network (e.g., VNI=5001). In the example in FIG. 1, hypervisor-A 114A implements a first VTEP with IP address=IP-A, hypervisor-B 114B implements a second VTEP with IP address=IP-B, and hypervisor-C 114C implements a third VTEP with IP address=IP-C. Encapsulated packets may be sent via an end-to-end, bi-directional communication path (known as a tunnel) established between a pair of VTEPs over physical network 140.

SDN controller 160 is responsible for collecting and disseminating information relating to logical overlay networks to host 110A/110B/110C, such as network topology, VTEPs, mobility of the virtual machines, firewall rules and policies, etc. To send and receive the information, host 110A/110B/110C (e.g., local control plane (LCP) agent 115A/115B/115C) maintains control-plane connectivity with SDN controller 160 (e.g., central control plane module 162). Control channel 164/166/168 between host 110A/110B/110C and SDN controller 160 may be established using any suitable protocol, such as TCP over Secure Sockets Layer (SSL), etc.

Conventionally, in SDN environment 100, multicast packets are treated as broadcast, unknown unicast and multicast (BUM) packets that are sent in a broadcast manner. This means multicast packets that are addressed to a particular multicast group address will be sent it to all known VTEPs, regardless of whether they interested in the multicast packets. For example in FIG. 1, VM1 is located on VXLAN5001 and hypervisor-A 114A is aware of VTEPs implemented by respective hypervisor-B 114B and hypervisor-C 114C. In response to detecting an egress multicast packet from VM1 131 that is addressed to a multicast group address (e.g., IP-M), the multicast packet will be broadcasted to all other virtual machines 133-136 on VXLAN5001.

In particular, hypervisor-A 114A will send the multicast packet to both host-B 110B and host-C 110C. A first encapsulated multicast packet is generated by encapsulating the multicast packet with an outer header addressed from a source VTEP at hypervisor-A 114A to a destination VTEP at hypervisor-B 114B. A second encapsulated multicast packet is generated by encapsulating the multicast packet with an outer header addressed from the source VTEP at hypervisor-A 114A to a destination VTEP at hypervisor-C 114C. However, although VM3 133 and VM3 134 are located on VXLAN5001, they are not members of the multicast group address and therefore not interested in the multicast packet. As such, the first encapsulated multicast packet will be dropped by hypervisor-B 114B, thereby incurring unnecessary packet handling cost on both hypervisor-A 114A and hypervisor-B 114B.

The above conventional approach is undesirable because it causes unnecessary flooding in SDN environment 100 and wastes resources. These problems are exacerbated when there are multicast applications that continuously generate heavy multicast traffic, such as applications relating to video distribution (e.g., Internet Protocol television (IPTV) applications, video conference, video-on-demand, etc.), voice distribution, large file distribution, etc. Further, since there may be tens or hundreds of VTEPs in SDN environment 100, network performance will be adversely affected by the flooding of multicast packets.

Multicast Packet Handling Based on Control Information

According to examples of the present disclosure, multicast packet handling may be improved by leveraging control information associated with a multicast group address. For example in FIG. 1, instead of propagating multicast traffic to all VTEPs known to source hypervisor-A 114A and causing unnecessary flooding, the multicast traffic will be more accurately sent to destination hypervisor-C 114C. Based on the control information, no multicast traffic will be sent to hypervisor-B 114B.

Figure 2:
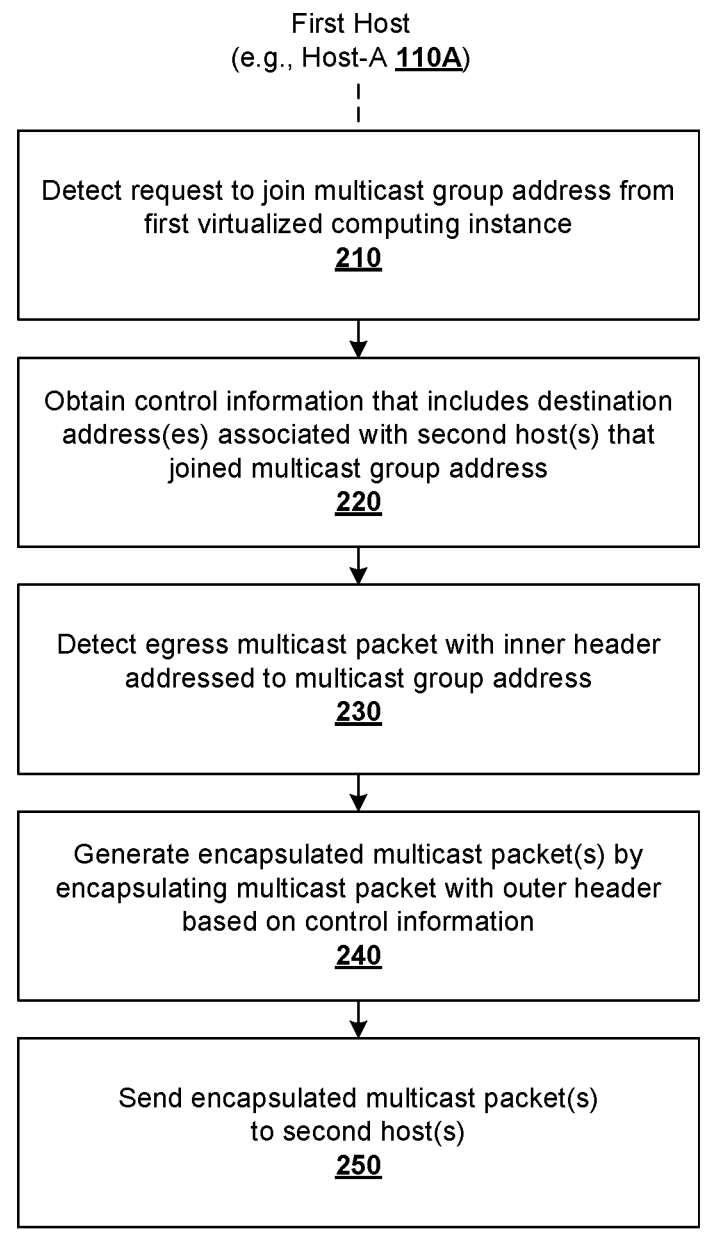
FIG. 2 is a flowchart of an example process for a host to perform multicast packet handling in an SDN environment.

In more detail, FIG. 2 is a flowchart of example process 200 for a host to perform multicast packet handling in SDN environment 100. Example process 200 may include one or more operations, functions, or actions illustrated by one or more blocks, such as 210 to 250. The various blocks may be combined into fewer blocks, divided into additional blocks, and/or eliminated depending on the desired implementation. In the following, various examples will be explained using VM1 131 as a "first virtualized computing instance," host-A 110A as a "first host," VM5 135 and VM6 136 as "second virtualized computing instances," "host-C 110C" as a "second host" that has joined a multicast group address on behalf of the "second virtualized computing instances," and SDN controller 160 as a "network management entity." Example process 200 may be implemented using host-A 110A, such as using hypervisor-A 114A, etc.

At 210 and 220 in FIG. 2, in response to host-A 110A detecting a request to join a multicast group address from VM1 131, control information 170 associated with the multicast group address is obtained from SDN controller 160. Control information 170 includes a "destination address" (to be explained further below) associated with host-C 110C that has joined the multicast group address on behalf of VM5 135 and VM6 136.

At 230 and 240 in FIG. 2, in response to host-A 110A detecting egress multicast packet 180 that includes an inner header (labelled "I") addressed to the multicast group address, encapsulated multicast packet 182 is generated based on control information 170, particularly by encapsulating multicast packet 180 with an outer header (labelled "O") addressed to the destination address associated with host-C 110C. At 250 in FIG. 2, encapsulated multicast packet 182 is sent to host-C 110C via physical network 140, which forwards encapsulated multicast packet 182 based on the outer header. At destination host-C 110C, in response to receiving the encapsulated multicast packet, hypervisor-C 114C performs decapsulation to remove the outer header, and sends decapsulated multicast packets to respective VM5 135 and VM6 136 (see 190 and 192 in FIG. 1). On the other hand, host-B 110B has not joined the multicast group address and will not receive the multicast traffic.

As will be described further using FIG. 3 to FIG. 10, example process 200 may be implemented to send encapsulated multicast packet(s) in a unicast manner or multicast manner, or a combination of both:

(a) Unicast mode: Multicast traffic is sent in a unicast manner (i.e., one to one). In this case, control information 170 includes destination address=IP-C, which is an address associated with a destination VTEP implemented by hypervisor-C 114C. Encapsulated multicast packet 182 includes an outer header addressed from source address=IP-A to destination address=IP-C. The unicast mode does not require underlying physical network 140 to have multicast capability. An example will be described using FIG. 5 and FIG. 6.

(b) Multicast mode: Multicast traffic is sent in a multicast manner (i.e., one to many) by leveraging the multicast capability of underlying physical network 140. In this case, control information 170 includes destination address=IP-G, which is a physical multicast group address associated with the multicast group address. Encapsulated multicast packet 182 is generated with an outer header addressed from source address=IP-A to destination address=IP-G, and sent to host-C 110C via multicast-enabled network device(s) in physical network 140 based on IP-G. An example will be described using FIG. 5 and FIG. 7.

In practice, a "multicast-enabled network device" may refer generally to a layer-2 switch, layer-3 router, etc., implementing any suitable multicast-enabling protocol. For example, multicast-enabled physical switches may support Internet Group Management Protocol (IGMP) for Internet Protocol version 4 (IPv4) systems, Multicast Listener Discovery (MLD) for IP version 6 (IPv6) systems, etc. Multicast-enabled physical routers may support Protocol Independent Multicast (PIM), Distance Vector Multicast Routing Protocol (DVMRP), Multicast Open Shortest Path First (MOSPF), etc. Such multicast-enabled network devices are capable of pruning multicast traffic from links or routes that do not have a multicast destination. For example, the multicast mode may be implemented when physical network 140 supports both IGMP snooping and PIM routing. Note that not all network device(s) forming physical network 140 have to be multicast-enabled.

(c) Hybrid mode: Multicast traffic is sent using a combination of unicast and multicast. For example, the hybrid mode may be used when underlying physical network 140 supports IGMP snooping, but not PIM routing. In this case, multiple encapsulated multicast packets may be generated. For destination(s) in the same IP subnet as source address=IP-A, the IGMP snooping capability may be leveraged to send a first encapsulated multicast packet in a multicast manner. For other destination(s) in a different IP subnet, a second encapsulated multicast packet may be sent in a unicast manner. An example will be described using FIG. 5, FIG. 8 and FIG. 9.

Compared to the conventional approach, examples of the present disclosure provide a more efficient and scalable solution that reduces the likelihood of unnecessary multicast traffic flooding and network resource wastage. Further, according to examples of the present disclosure, multicast packet handling may be implemented without any modification of network device(s) in underlying physical network 140. If the network device(s) are multicast-enabled (support IGMP snooping and/or PIM routing), the multicast or hybrid mode may be implemented to leverage their existing multicast capability. The unicast mode may be implemented regardless of whether physical network 140 has multicast capability. In the following, various examples will be described using FIG. 3 to FIG. 9.

Control Information

Figure 3:
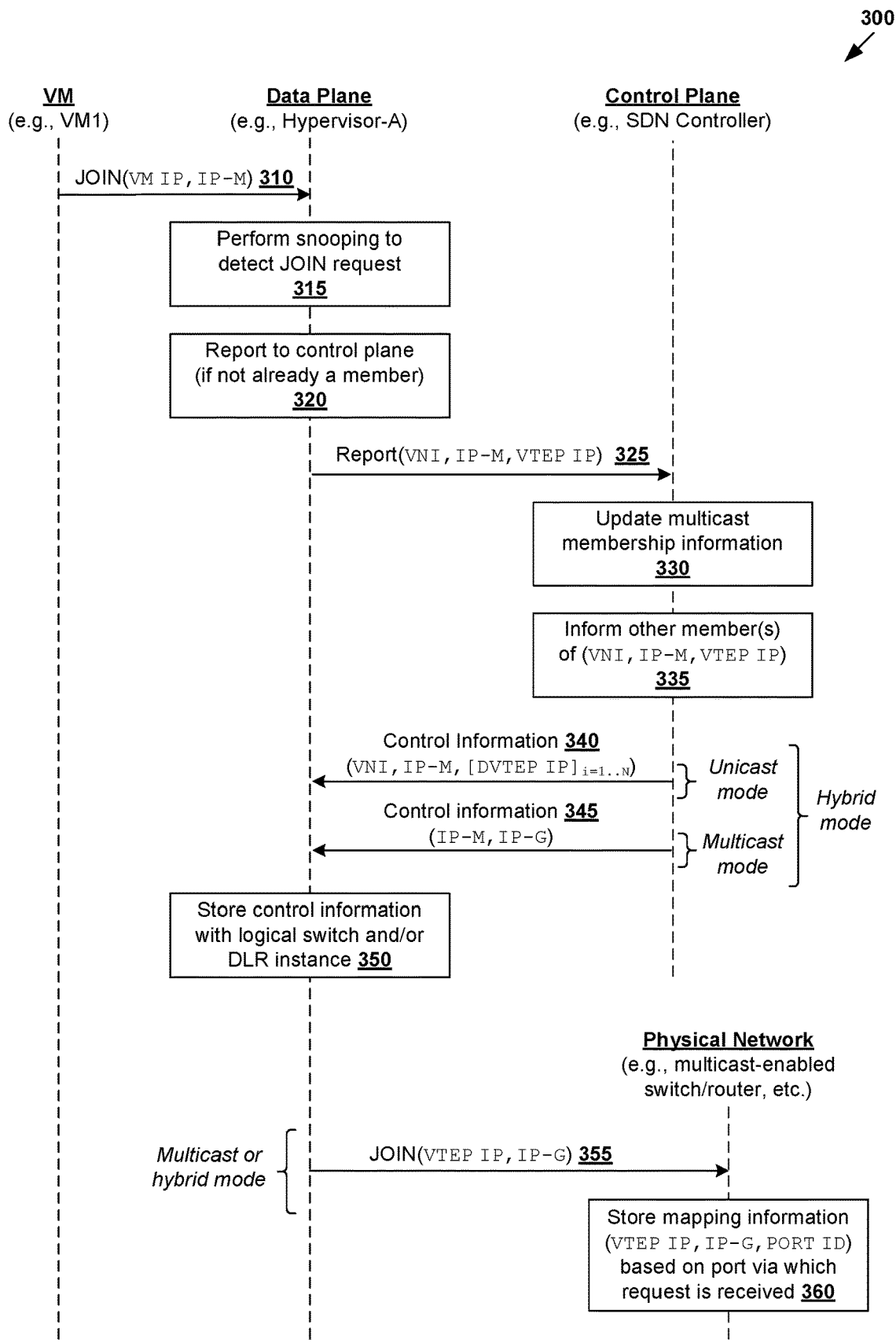
FIG. 3 is a schematic diagram of an example process for obtaining control information in an SDN environment.

Blocks 210 and 220 in FIG. 2 will be explained further using FIG. 3 and FIG. 4. In particular, FIG. 3 is a schematic diagram of example process 300 for obtaining control information in SDN environment 100. Example process 300 may include one or more operations, functions, or actions illustrated at 310 to 350. The various operations, functions or actions may be combined into fewer blocks, divided into additional blocks, and/or eliminated depending on the desired implementation. The "data plane" in FIG. 3 may be implemented by hypervisor-A 114 (e.g., using a kernel module), and the "control plane" by SDN controller 160 (e.g., central control plane module 162). Note that data plane at host-A 110A and control plane may communicate via LCP agent 115A.

Figure 4:
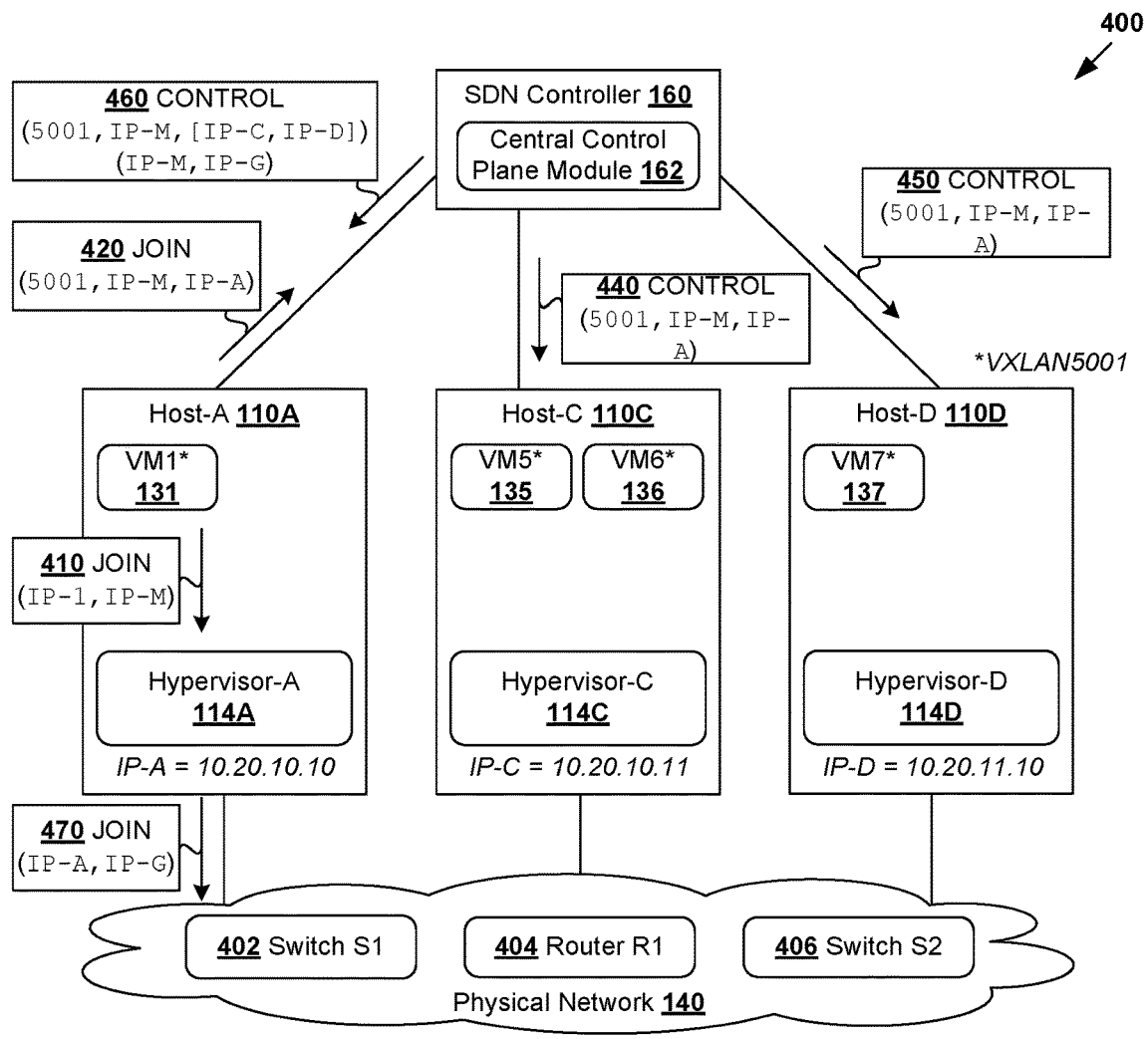
FIG. 4 is a schematic diagram illustrating a first example of obtaining control information according to the example in FIG. 3.

FIG. 4 is a schematic diagram illustrating first example 400 of obtaining control information according to the example in FIG. 3. Compared to FIG. 1, FIG. 4 includes host-D 110D that supports VM7 137, which is located on the same logical layer-2 segment (i.e., VXLAN5001) as VM1 131, VM5 135 and VM6 136. To facilitate communication over VXLAN5001, hypervisor-A 114A implements a VTEP with IP address IP-A=10.20.10.10, hypervisor-C 114A implements a VTEP with IP-C=10.20.10.11 (i.e., same IP subnet 10.20.10.0/24 as IP-A) and hypervisor-D 114 implements a VTEP with IP-D=10.20.11.10 (i.e., different IP subnet 10.20.11.0/24). For simplicity, host-B 110B is not shown because it does support any multicast destinations and no multicast traffic will be sent to host-B 110B.

FIG. 4 also shows various network devices in physical network 140, i.e., physical switches "Si" 402 and "S2" 406. Although not shown in FIG. 4 for simplicity, host-A 110A may be connected to host-C 110C via "Si" 402, and to host-D 110D via "R1" 404 and "S2" 406. As will be described further below, depending on whether "Si" 402, "R1" 404 and "S2" 406 are multicast-enabled, each host may be configured to implement the unicast, multicast or hybrid mode. The configuration may be made by a user via an interface provided by SDN manager 150. In the following, IGMP snooping and PIM routing will be used as examples.

Referring now to FIG. 3, at 310 and 315, hypervisor-A 114 performs snooping to detect request 410 to join a multicast group address from VM1 131. In the example in FIG. 4, join request 410 identifies (IP-1, IP-M), where IP-1 is a VM IP address associated with VM1 131 and IP-M is a multicast group address. For example, using IPv4 addressing, IP-M=239.1.1.1 (i.e., within 224.0.0.0 to 239.255.255.255).

At 320 and 325 in FIG. 3, hypervisor-A 114 generates and sends request 420 to SDN controller 160. Request 420 identifies (VNI=5001, multicast group address=IP-M, source VTEP address=IP-A). Request 420 is to inform SDN controller 160 that hypervisor-A 114A is joining the multicast group address on behalf of VM1 131, thereby acting as a multicast proxy for VM1 131. If a subsequent request is detected from another virtual machine, it is not necessary for host-A 110A to send another join request to SDN controller 160.

At 330 in FIG. 3, in response to receiving request 420, SDN controller 160 updates multicast group membership information associated with the multicast group address. In the example in FIG. 4, SDN controller 160 updates multicast group table 430 by adding IP-A to the list of VTEPs that have joined multicast group address=IP-M. SDN controller 160 may maintain multicast group table 430 per (VNI, IP-M) pair. Since IP-C and IP-D are already listed as members, it should be understood that SDN controller 160 has previously received similar join requests from respective hypervisor-C 114C identifying (5001, IP-M, IP-C), and from hypervisor-D 114D identifying (5001, IP-M, IP-D).

At 335 in FIG. 3, SDN controller 160 informs host-C 110C and host-D 110D of the newest member of the multicast group address. In the example in FIG. 4, control information 440 identifying (5001, IP-M, IP-A) is sent to host-C 110C, which then updates its local multicast group table 445 to add IP-A as a destination VTEP address for multicast packets addressed to IP-M. Similarly, control information 450 identifying (5001, IP-M, IP-A) is sent to host-D 110D, which adds IP-A to multicast group table 455.

At 340 and 345 in FIG. 3, hypervisor-A 114 obtains control information 460 associated with the multicast group address from SDN controller 160. Here, the term "obtain" may refer to hypervisor-A 114 receiving or retrieving the information, etc. Control information 460 is to facilitate multicast packet handling according to the following unicast, multicast or hybrid mode.

(a) To implement the unicast mode, control information 460 includes VNI=5001, multicast group address=IP-M, destination VTEP addresses=[IP-C, IP-D]. This allows hypervisor-A 114 to send multicast traffic to hypervisor-C 114C and hypervisor-D 114D in a unicast manner using their respective destination VTEP addresses. The unicast mode does not require switch 402/406 and router 404 in physical network 140 to have any multicast capability.

(b) To implement the multicast mode, control information 460 includes an (IP-M, IP-G) mapping, where IP-M represents a (logical) multicast group address used within the logical overlay network, and IP-G represents a physical multicast group address registered with physical network 140. In this case, multicast traffic will be addressed to destination address=IP-G to reach multiple destinations that have joined IP-M. The multicast mode may be configured when switches 402, 406 have IGMP snooping capability and router 404 has PIM routing capability.

In practice, IP-G may be selected from a pool of addresses that are valid for multicast traffic forwarding over physical network 140. The pool may be configured by a network administrator via SDN manager 150 on the management plane. The consistency of the physical IP assignment or mapping should be guaranteed across all hypervisors, in that they should learn the same unique (IP-M, IP-G) mapping. For example, to avoid conflict, SDN controller 160 may maintain the pool of physical multicast group addresses in a shared storage. A pessimistic or optimistic lock mechanism is then applied to the pool to avoid assigning the same physical IP-G to two different multicast group addresses.

(c) To implement the hybrid mode: control information 460 includes VNI=5001, multicast group address=IP-M, destination=[IP-C, IP-D], as well as (IP-M, IP-G) mapping. The hybrid mode may be configured when underlying physical network 140 supports IGMP snooping, but not PIM routing. In this case, multicast traffic may be sent to destination(s) on the same IP subnet in a multicast manner, and to other destination(s) on a different IP subnet in a unicast manner.

At 350 in FIG. 3, hypervisor-A 114A receives and stores the control information obtained from SDN controller 160 in multicast group table 465. In one example, hypervisor-A 114 may receive a "full" set of control information 460 that includes both (5001, IP-M, [IP-C, IP-D]) and (IP-M, IP-G) from SDN controller 160, i.e., regardless of the mode configured. Alternatively, only the relevant information is obtained, that is (5001, IP-M, [IP-C, IP-D]) for the unicast/ hybrid mode or (IP-M, IP-G) for the multicast/hybrid mode.

At 355 in FIG. 3, if the multicast or hybrid mode is configured, hypervisor-A 114A generates and sends a request to join the physical multicast group address. In the example in FIG. 4, join request 470 identifies (source address=IP-A, physical multicast group address=IP-G). Join request 470 serves as a multicast group membership advertisement to underlying physical network 140. For example, join request 470 may be an IGMP host membership report using IGMPv1 or IGMPv2, or an IGMP report packet using IGMPv3. MLD may be used for IPv6 systems.

At 360 in FIG. 3, in response to receiving join request 470, a multicast-enabled network device in physical network 140 stores multicast mapping information (IP-G, source address=IP-A, port ID=P3) in multicast group table 475. Port ID identifies a receiving port via which join request 470 is received from host-A 110A. Although not shown in FIG. 4, it should be understood that host-C 110C and host-D 110D may send respective join requests identifying (IP-C, IP-G) and (IP-D, IP-G) to advertise their multicast group membership in a similar manner.

This way, a multicast-enabled network device that has received the join packets is able to learn the mapping information (IP-G, IP-C, P1), (IP-G, IP-D, P2) and (IP-G, IP-A, P3) shown in FIG. 4. The multicast-enabled network device does not send multicast packets addressed to IP-G out to all ports, but only to ports listed in multicast group table 475 (except for the port via which the multicast packet is received). If IGMP snooping is supported by switches 402, 406 and PIM routing by router 404, they will each maintain a similar multicast group table 475. Note that the port IDs may be different at each device, and different join requests may be received via the same port.

Multicast Traffic Handling Based on Control Information

Blocks 230, 240 and 250 in FIG. 2 will be explained further using FIG. 5, which is a schematic diagram of example process 500 for a host to perform multicast packet handling based on the control information obtained according to the example in FIG. 3. Example process 500 may include one or more operations, functions, or actions illustrated at 510 to 546. The various operations, functions or actions may be combined into fewer blocks, divided into additional blocks, and/or eliminated depending on the desired implementation. Example process 500 will be explained using FIG. 6 (unicast), FIG. 7 (multicast) and FIG. 8 (hybrid).

(a) Unicast Mode

Figure 5:
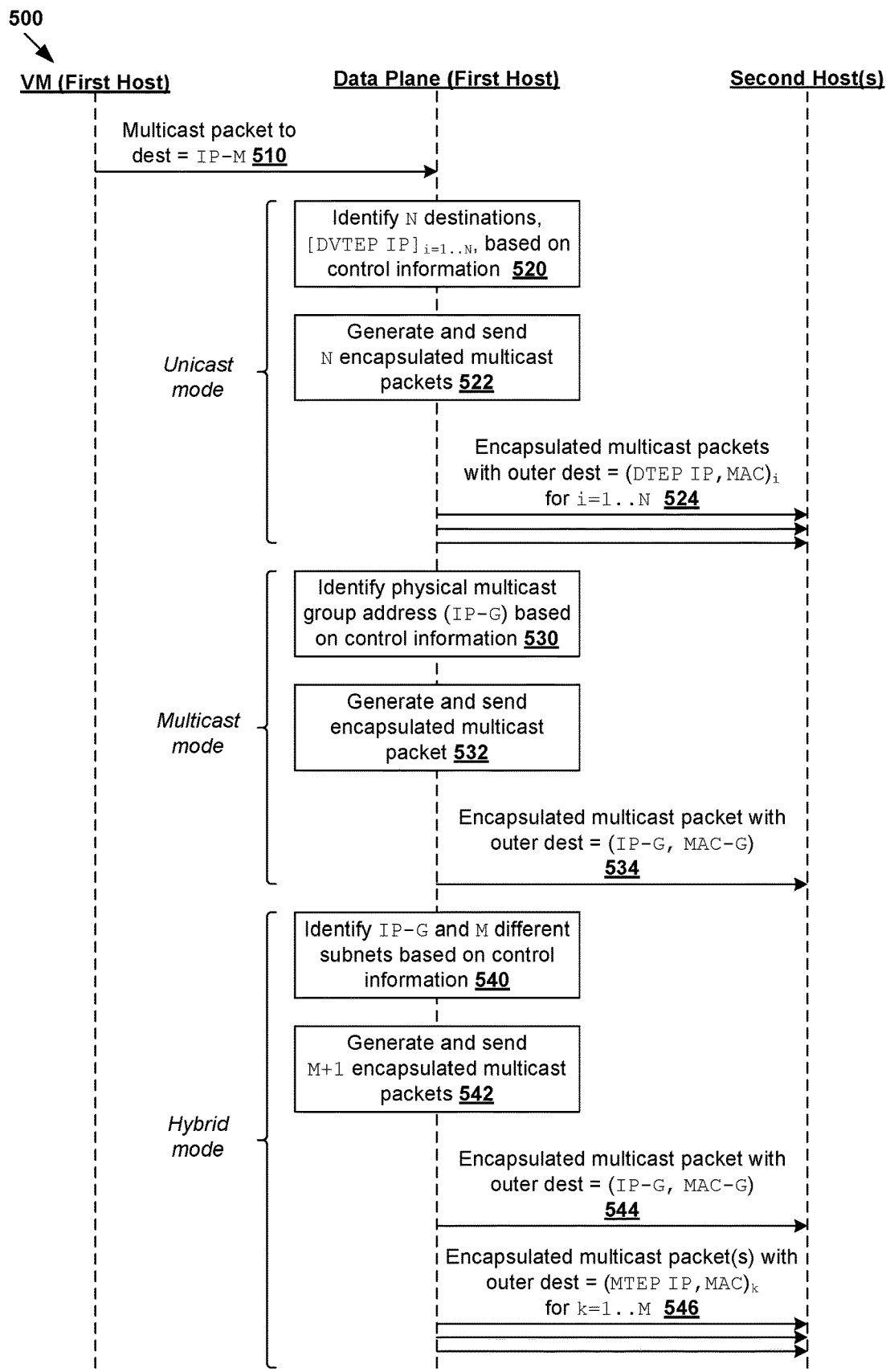
FIG. 5 is a flowchart of an example process for a host to perform multicast packet handling based on the control information obtained according to the example in FIG. 3.
Figure 6:
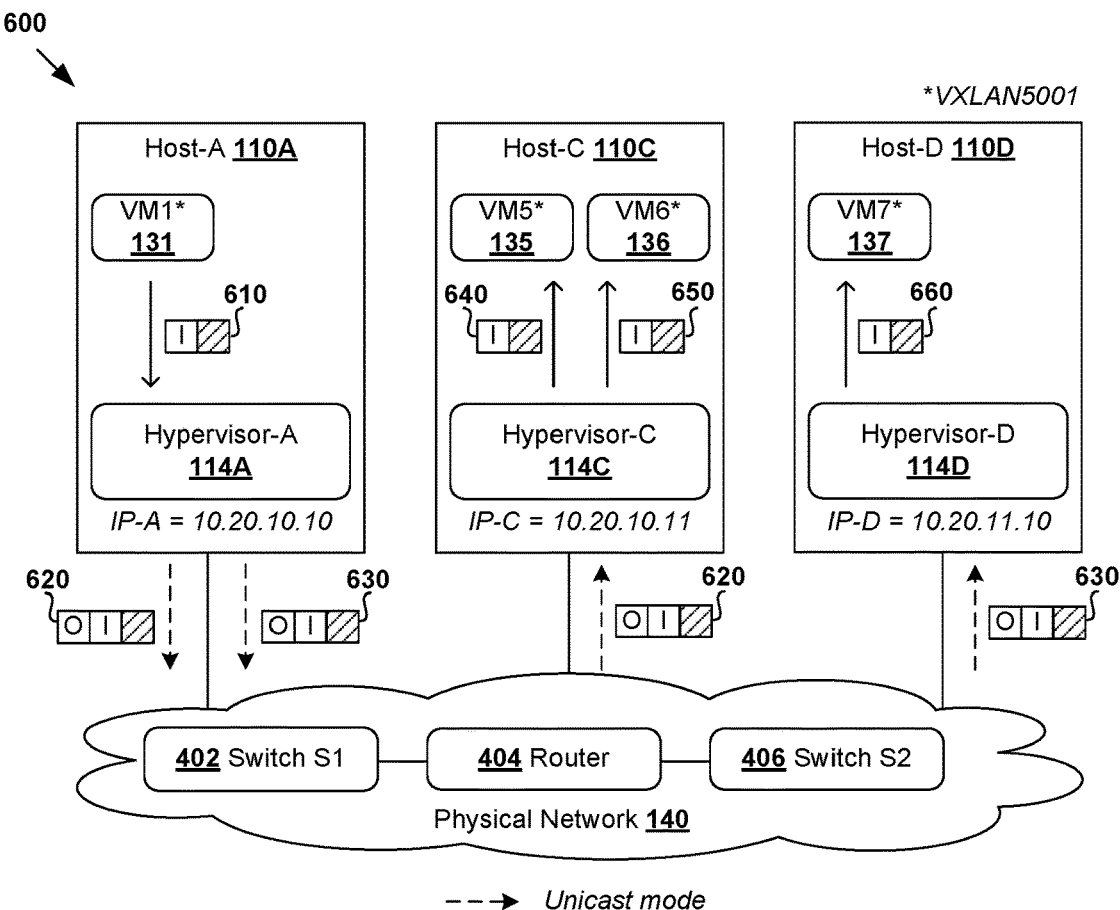
FIG. 6 is a schematic diagram illustrating an example unicast mode for multicast packet handling according to the example in FIG. 5.

FIG. 6 is a schematic diagram illustrating example unicast mode 600 for multicast packet handling according to the example in FIG. 5. Consider the case where VM1 131 on VXLAN5001 sends egress multicast packet 610 to multicast group address=IP-M. Egress multicast packet 610 includes inner header 612 and multicast payload 614. Inner header 612 includes source address information (source IP=IP-1, MAC=MAC-1) associated with VM1 131, and destination address information (destination IP=IP-M, MAC=MAC-M).

Referring also to FIG. 5, at 510 and 520, in response to detecting egress multicast packet 610 from VM1 131 via port VP1 141, two destinations (i.e., N=2) are identified based on the control information stored in multicast group table 465 in FIG. 4. At 522 and 524 in FIG. 5, two encapsulated multicast packets 620, 630 are generated. First encapsulated multicast packet 620 includes outer header 622 with destination address information (destination VTEP IP=IP-C, MAC=MAC-C) associated with a destination VTEP implemented by hypervisor-C 114C.

Second encapsulated multicast packet 620 includes outer header 632 addressed to (IP-D, MAC-D) associated with a destination VTEP implemented by hypervisor-D 114D. Outer header 622/632 includes source address information (source IP=IP-A, MAC=MAC-A) associated with a source VTEP implemented by hypervisor-A 114A, and VNI=5001 identifies the logical overlay network (i.e., VXLAN5001) on which source VM1 131 is located.

Hypervisor-A 114A sends encapsulated multicast packets 620, 630 in a unicast manner. First encapsulated multicast packet 620 is forwarded via physical network 140 to host-C 110C based on (IP-C, MAC-C), and second encapsulated multicast packet 630 to host-D 110D based on (IP-D, MAC-D). At host-C 110C, outer header 622 is removed (i.e., decapsulation) before multicast packets 640, 650 are sent to members VM5 135 and VM6 136 respectively. At host-D 110D, decapsulated multicast packet 660 is sent to member VM7 137. No multicast traffic will be sent to host-B 110B in FIG. 1.

(b) Multicast Mode

Figure 7:
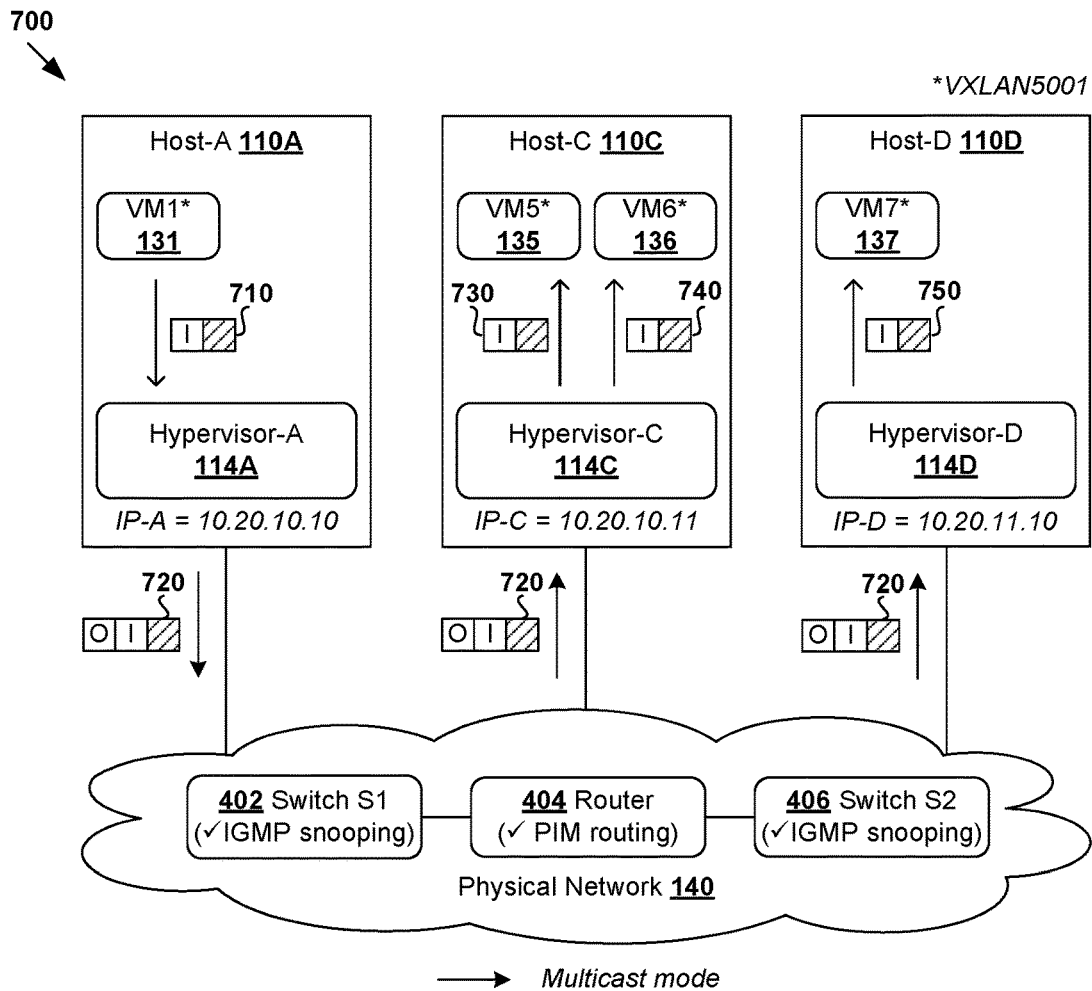
FIG. 7 is a schematic diagram illustrating an example multicast mode for multicast packet handling according to the example in FIG. 5.

FIG. 7 is a schematic diagram illustrating example multicast mode 700 for multicast packet handling according to the example in FIG. 5. Unlike the unicast mode in FIG. 6, the multicast mode leverages the IGMP snooping capability of switches 402, 404 and PIM routing capability of router 406 to send multicast packets in a multicast manner.

At 510 and 530 in FIG. 5, in response to detecting egress multicast packet 710 from VM1 131, IP-G associated with IP-M in inner header 712 is identified based on multicast group table 465 in FIG. 4. Further, at 532 and 534 in FIG. 5, encapsulated multicast packet 720 is generated by encapsulating egress multicast packet 710 with outer header 722, which includes (destination VTEP IP=IP-G, MAC=MAC-G), (source VTEP IP=IP-A, MAC=MAC-A) and VNI=5001. Host-A 110A then sends encapsulated multicast packet 720 in a multicast manner by leveraging the multicast capability of switches 402, 406 and router 406.

In particular, based on mapping information (IP-G, IP-C, port ID) previously learned from a join request from host-C 110C, multicast-enabled network device 402/404/406 will forward encapsulated multicast packet 720 to host-C 110C. At host-C 110C, outer header 722 is removed and decapsulated multicast packets 730, 740 sent to members VM5 135 and VM6 136 respectively. Similarly, based on mapping information (IP-G, IP-D, port ID) learned from a join request from host-D 110D, encapsulated multicast packet 720 will be forwarded to host-D 110D, which sends decapsulated multicast packet 750 to VM7 137. No multicast traffic will be sent to host-B 110B in FIG. 1.

(c) Hybrid Mode

Figure 8:
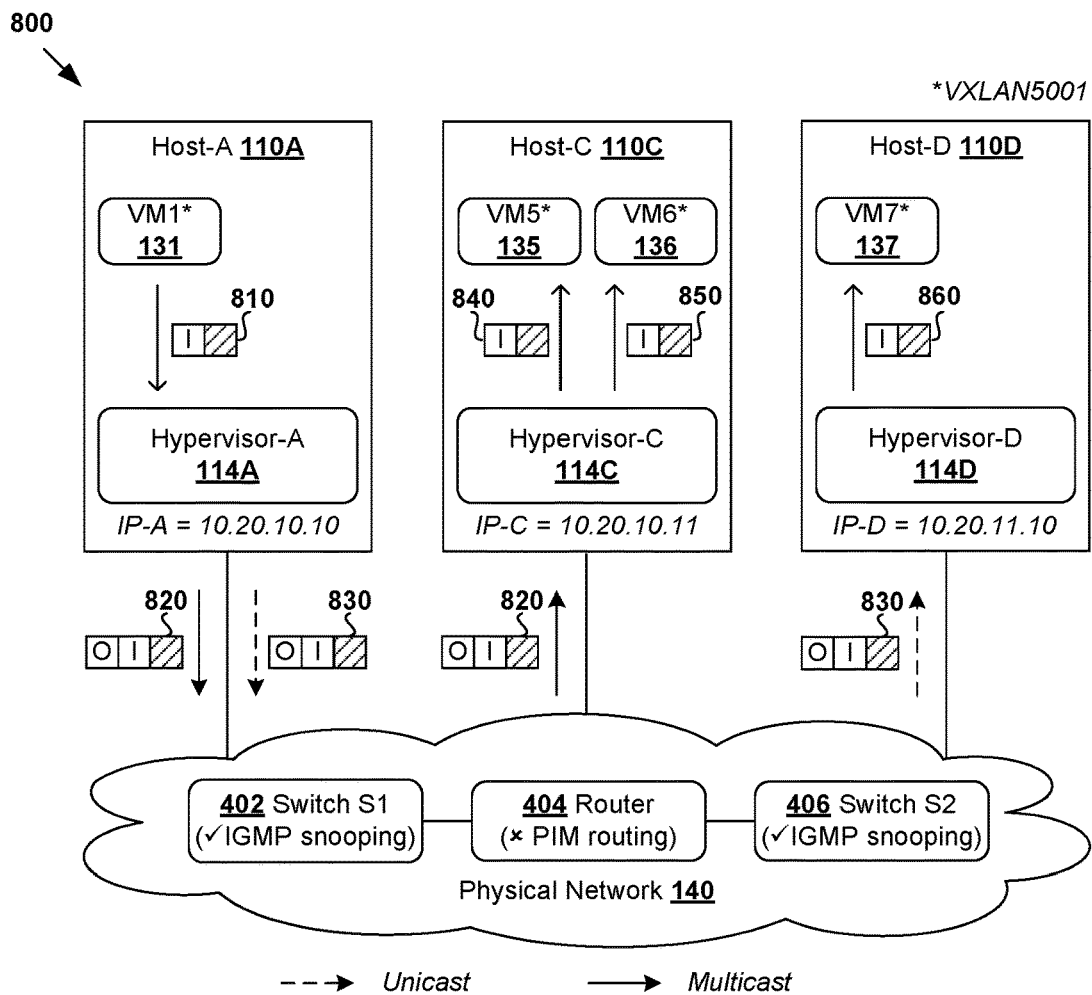
FIG. 8 is a schematic diagram illustrating a first example hybrid mode for multicast packet handling according to the example in FIG. 5.

FIG. 8 is a schematic diagram illustrating first example hybrid mode 800 for multicast packet handling according to the example in FIG. 5. The hybrid mode may be implemented when switches 402, 406 have IGMP snooping capability, but router 404 does not have PIM routing capability. In this case, if the source VTEP and destination VTEP belong to the same IP subnet, multicast packets may be sent in a multicast manner. Otherwise, multicast packets are sent in a unicast manner.

(1) Same IP subnet: IP-A=10.20.10.10 associated with a source VTEP at hypervisor-A 114A is in the same IP subnet (i.e., 10.20.10.0/24) as IP-C=10.20.10.11 associated with a destination VTEP at hypervisor-C 114C. Since switch 402 connecting host-A 110A and host-C 110C supports IGMP snooping, multicast packets may be sent in a multicast manner within the same IP subnet. According to 510 and 540 in FIG. 5, in response to detecting egress multicast packet 810, IP-G associated with IP-M in inner header 812 is identified based on multicast group table 465 in FIG. 4.

According to 542 and 544 in FIG. 5, encapsulated multicast packet 820 is generated by encapsulating egress multicast packet 810 with outer header 822 addressed from (IP-A, MAC-A) to (IP-G, MAC-G). Based on mapping information (IP-G, IP-C, port ID) previously learned from a join request from host-C 110C, switch 402 forwards encapsulated multicast packet 820 to destination hypervisor-C 114C. Decapsulated multicast packets 840, 850 are then sent to members VM5 135 and VM6 136 respectively.

(2) Different IP subnets: IP-A=10.20.10.10 is in a different IP subnet compared to IP-D=10.20.11.10 associated with a destination VTEP at hypervisor-D 114D. Since router 404 does not support PIM routing, multicast packets destined for IP-D will be sent in a unicast manner to a multicast tunnel endpoint (MTEP) selected for IP subnet 10.20.11.0/24 associated with IP-D. As used herein, the term "MTEP" may refer generally to a particular VTEP responsible for replication to other local VTEP(s) located in the same IP subnet as the MTEP.

In the example in FIG. 8, it is assumed that hypervisor-D 114D implements the MTEP with destination address=IP-D. According to 510, 540, 542 and 546 in FIG. 5, in response to detecting egress multicast packet 810, encapsulated multicast packet 830 is generated with outer header 832 addressed from (source VTEP IP=IP-A, MAC=MAC-A) to (destination MTEP IP=IP-D, MAC=MAC-D). Encapsulated multicast packet 830 is sent to host-D 110D in a unicast manner. At host-D 110D, decapsulated multicast packet 860 is sent to VM7 137.

The number of encapsulated multicast packets to be generated and sent in a unicast manner is M, which is the number of destination IP subnets that are different from the IP subnet of IP-A. The $k^{th}$ encapsulated multicast packet, where k=1, . . . , M, is addressed to MTEP$_k$ associated with the kth IP subnet. See also corresponding 546 in FIG. 5. The case of M=2 is shown in FIG. 9, which is a schematic diagram illustrating second example hybrid mode 900 for multicast packet handling according to the example in FIG. 5.

Figure 9:
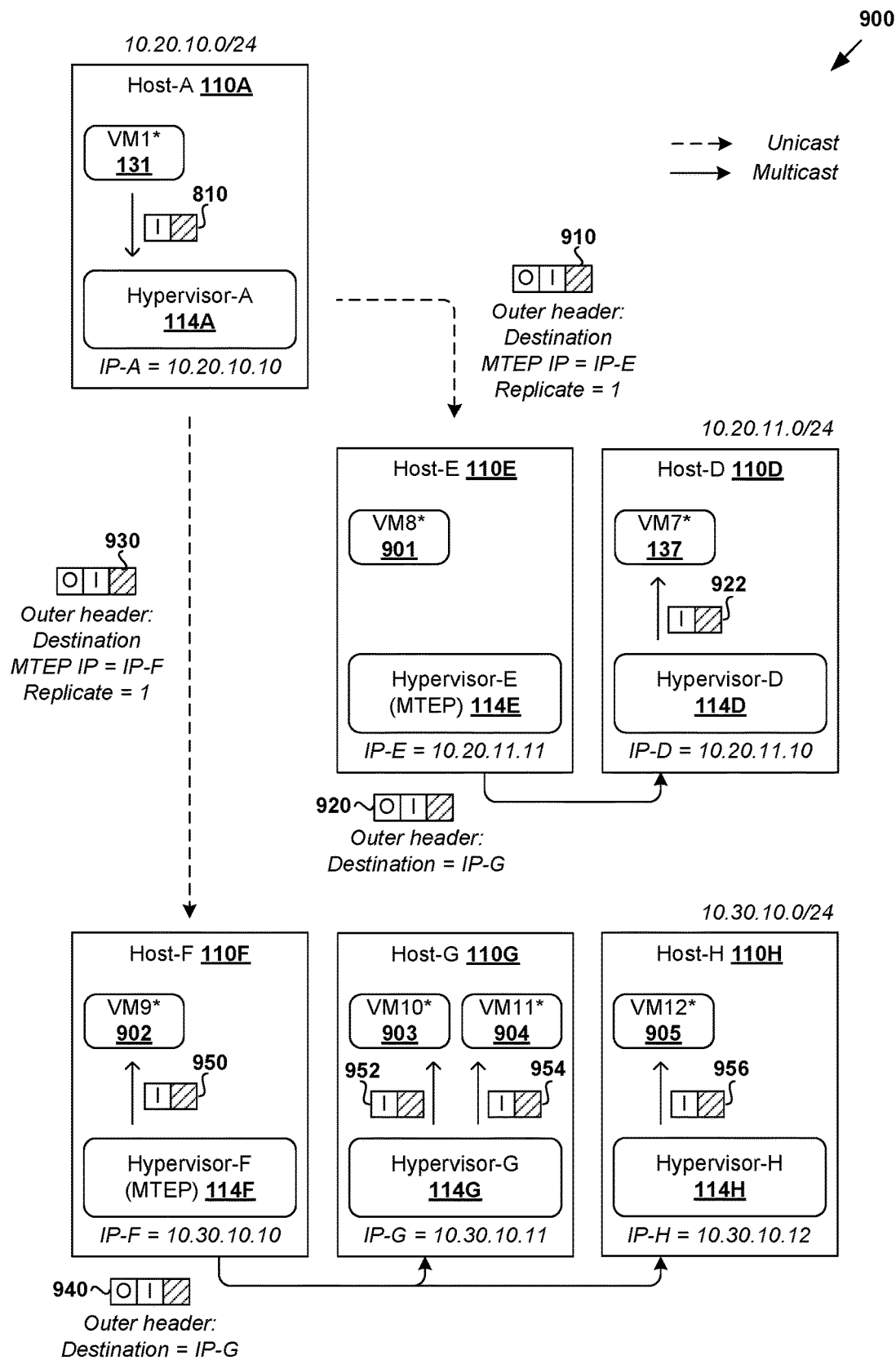
FIG. 9 is a schematic diagram illustrating a second example hybrid mode for multicast packet handling according to the example in FIG. 5.

In the example in FIG. 9, hypervisor-E 114E at host-E 110E implements an MTEP for IP subnet=10.20.11.0/24 (i.e., instead of hypervisor-D 114D in FIG. 8). For this IP subnet (k=1), encapsulated multicast packet 910 is generated with an outer header addressed to (MTEP IP=IP-E, MAC=MAC-E). A REPLICATE bit in the outer header may be set to indicate to the MTEP that the packet is to be locally replicated. In response to detecting encapsulated multicast packet 910, host-E 110E removes the outer header, determines that IP-M in the inner header is mapped to IP-G, and generates encapsulated multicast packet 920 with an outer header addressed to (IP-G, MAC-G). Encapsulated multicast packet 920 is sent via physical switch(es) that support IGMP snooping to hypervisor-D 114D, which then forwards decapsulated multicast packet 922 to VM7 137.

For destination VTEPs that are in a further IP subnet=10.30.10.0/24 (k=2), hypervisor-F 114F of host-F 110F implements an MTEP for that IP subnet. In this case, encapsulated multicast packet 930 is generated with an outer header addressed to (MTEP IP=IP-F, MAC=MAC-F). Based on the REPLICATE=1 bit in the outer header, hypervisor-F 114F determines that packet replication is required. As such, encapsulated multicast packet 940 with an outer header addressed to (IP-G, MAC-G) is generated and sent via physical switch(es) that support IGMP snooping to host-G 110G and host-H 110H. Decapsulated multicast packets 950, 952, 954, 956 are forwarded to members VM9 902, VM10 903, VM11 904 and VM12 905, respectively.

Multicast Traffic across Different Logical Layer-2 Segments

In the above examples, multicast packets are transmitted within the same logical layer-2 segment (i.e., VXLAN5001) where the source and destination virtual machines are connected by a logical switch. In this case, multicast group table 465 in FIG. 4 may be stored in association with the logical switch (e.g., represented as an entry in forwarding table 117A maintained by virtual switch 116A). To support multicast traffic across different logical layer-2 segments, east-west traffic may be routed via a logical distributed router where the source virtual machine may be on one logical layer-2 segment (e.g., VXLAN5001) and the destination virtual machine on another (e.g., VXLAN5002). In this case, multicast group table 465 in FIG. 4 may be stored in association with the logical distributed router (e.g., represented as an entry in routing table 119A maintained by DR instance 118A). See corresponding 350 in FIG. 3.

In the physical network environment, PIM routing allows multicast traffic across a physical router. In the logical network environment, a logical centralized router (e.g., implemented using an edge virtual machine) may be configured to support PIM routing just like a physical router. For a logical distributed router that spans multiple hosts, distributed PIM may be implemented by leveraging control information obtained from the control plane. In this case, the control plane maintains a multicast group table for each multicast group address within a routing domain. Here, a "routing domain" may represent multiple logical layer-2 segments that are connected to the same logical distributed router, such as a lower-tier tenant logical router (TLR) or upper-tier provider logical router (PLR). SDN controller 160 on the control plane is aware of the routing domain topology in SDN environment 900 and pushes the appropriate destination VTEP address information and (IP-M, IP-G) mapping to the data plane associated with the routing domain.

Figure 10:
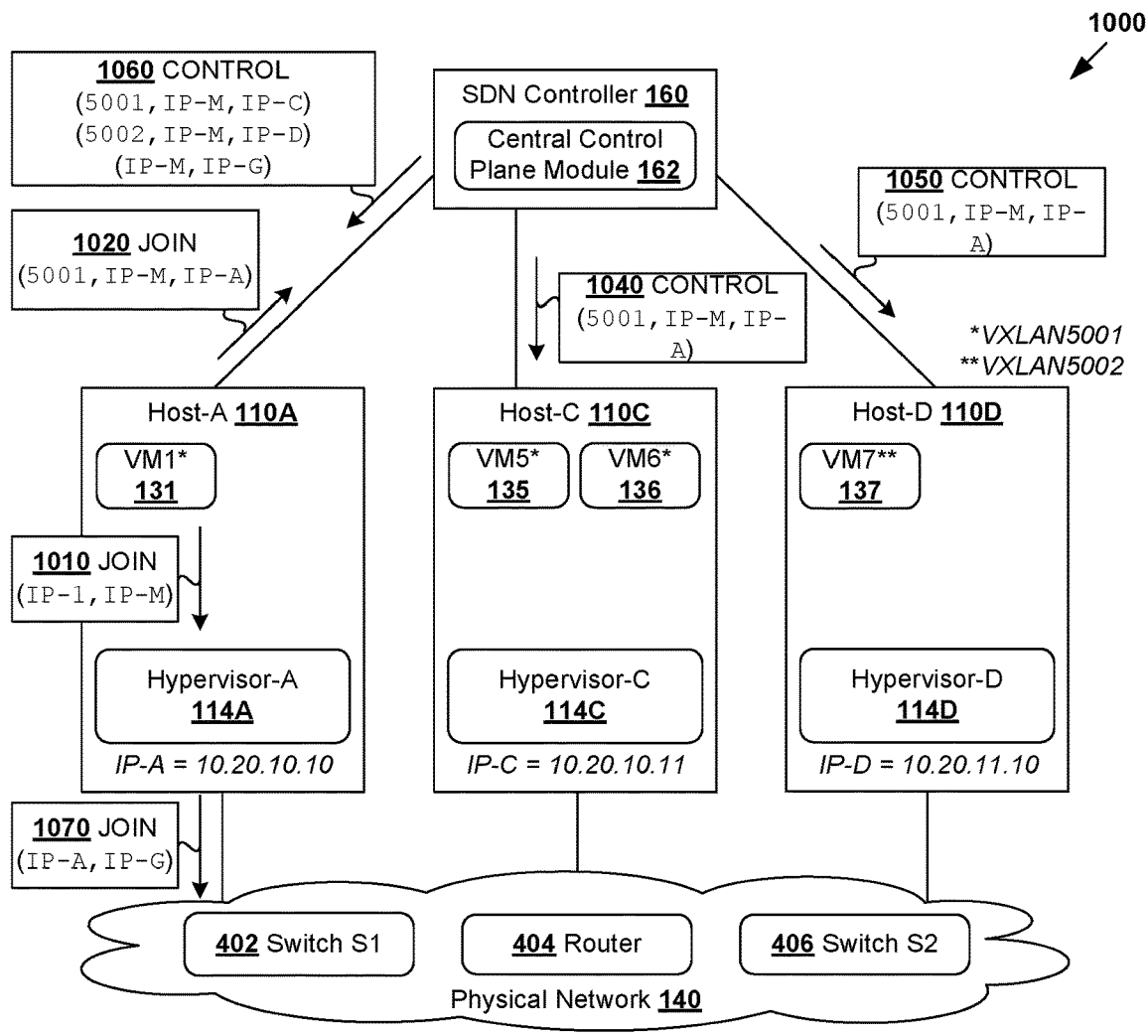
FIG. 10 is a schematic diagram illustrating a second example of obtaining control information according to the example in FIG. 3.

FIG. 10 is a schematic diagram illustrating second example 1000 of joining a multicast group address according to the example in FIG. 3. Unlike the example in FIG. 4, VM7 137 on host-D 110D is connected to a different layer-2 logical segment (VNI=5002) compared to VM1 131 on host-A 110A (VNI=5001) and SDN controller 160 handles join requests from multiple logical layer-2 segments. Similarly, in response to detecting join request 1010 with (IP-1, IP-M) from VM1 131, hypervisor-A 114A sends join request 1020 with (5001, IP-M, IP-A) to SDN controller 160.

Based on multicast group table 1030 at SDN controller 160, updated control information 1040/1050 that includes (VNI=5001, IP-M, IP-A) is sent to existing members hypervisor-C 114C and hypervisor-D 114D. New member hypervisor-A 114A obtains control information 1060 that includes (VNI=5001, IP-M, IP-C), (VNI=5002, IP-M, IP-D) and (IP-M, IP-G). Control information 1040/1050/1060 is stored in multicast group table 1045/1055/1065 in association with the relevant logical switch and logical distributed router. Subsequent multicast packet handling may be performed as follows.

(a) Unicast mode: Similar to the example in FIG. 6, in response to detecting egress multicast packet 610 from VM1 131, IP-C and IP-D are identified as destination VTEP addresses based on multicast group table 1065 in FIG. 10. A first encapsulated multicast packet with an outer header addressed to (IP-C, MAC-C) is sent to host-C 110C in a unicast manner. A second encapsulated multicast packet with an outer header addressed to (IP-D, MAC-D) is sent to host-D 110D in a unicast manner. The logical network information (VNI=5001) in the outer header identifies the source logical network on which VM1 131 is located. See corresponding 510, 520-524 in FIG. 5.

(b) Multicast mode: Similar to the example in FIG. 7, one encapsulated multicast packet will be sent in a multicast manner to host-C 110C and host-D 110D by leveraging the IGMP snooping and PIM routing capability of physical network 140. The encapsulated multicast packet includes an outer header that is addressed to (IP-G, MAC-G) based on multicast group table 1065 in FIG. 10. See corresponding 510, 530-534 in FIG. 5.

(c) Hybrid mode: Similar to the example in FIG. 8, a combination of unicast and multicast may be implemented physical network 140 supports IGMP snooping, but not PIM routing. For destination IP-C that belongs to the same IP subnet as source IP-A, a first encapsulated multicast packet addressed to (IP-G, MAC-G) is sent in a multicast manner. For destination IP-D that belongs to a different IP subnet, a second encapsulated multicast packet is sent in a unicast manner to an associated MTEP. See corresponding 510, 540-546 in FIG. 5.

At each destination host, an encapsulated multicast packet may be processed by as follows. The encapsulated multicast packet may be decapsulated and dispatched to a logical switch module based on VNI=5001 in the outer header. The logical switch module finds the multicast group address (IP-M) and dispatches it to a DLR module, which then searches for the (VNI, IP-M, IP-G) in the relevant multicast group table and propagates the decapsulated multicast packet to all logical switches associated with the IP-M. The decapsulated multicast packet is then forwarded to each virtual machine who has joined IP-M.

Leaving a Multicast Group Address

Figure 11:
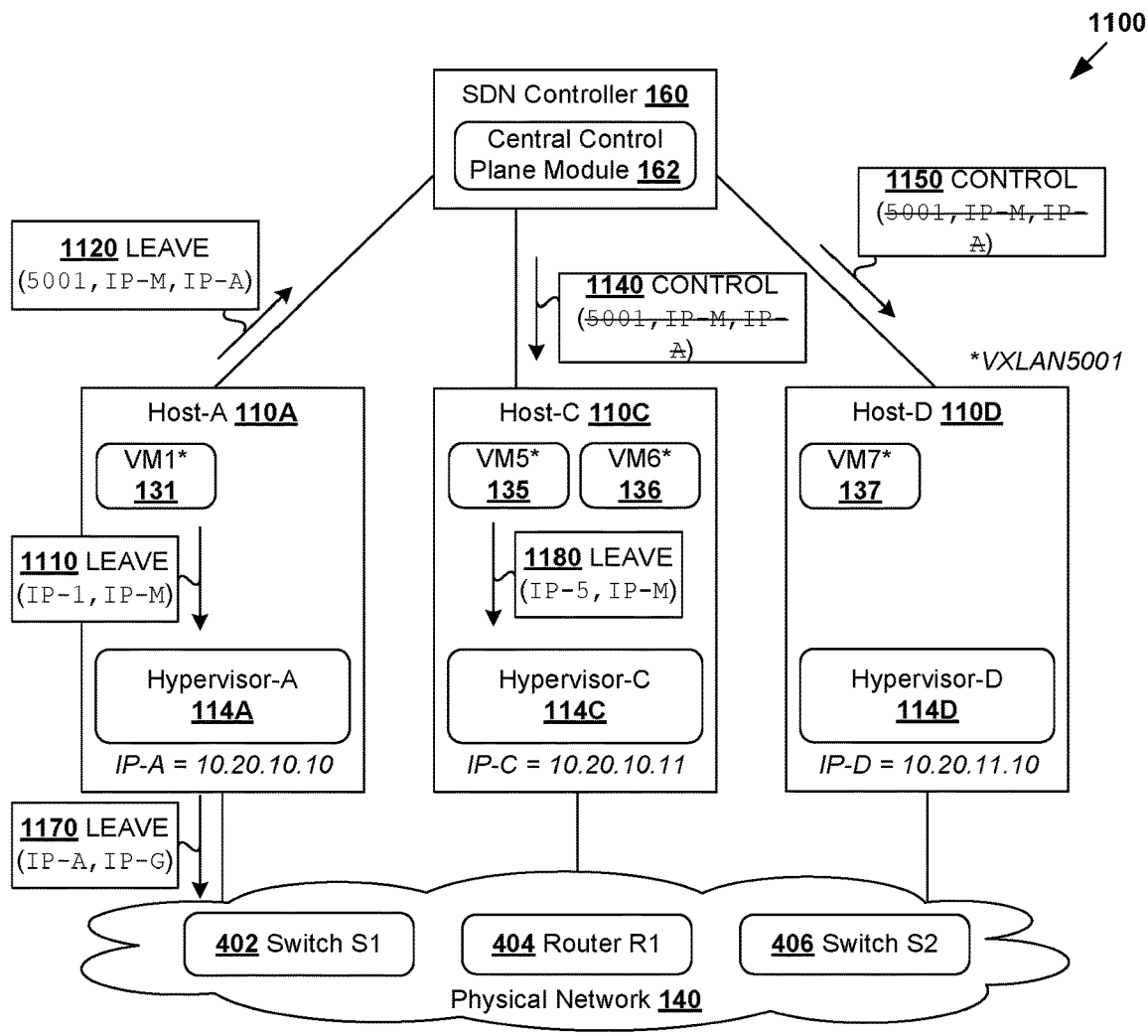
FIG. 11 is a schematic diagram illustrating an example of a host leaving a multicast group address.

FIG. 11 is a schematic diagram illustrating example 1100 of a host leaving a multicast group address. VM1 131 sends leave request 1110 identifying (IP-1, IP-M) when it wishes to leave IP-M. Since host-A 110A does not support any other member of IP-M, hypervisor-A 114A informs SDN controller 160 accordingly by sending leave request 1120 identifying (5001, IP-A, IP-M) and removes the content of multicast group table 465. Based on leave request 1120, SDN controller 160 removes IP-A from multicast group table 430 and sends instructions 1140/1150 to hypervisor 114C/114D to do the same. See corresponding updated multicast group tables 445, 455.

If the multicast or hybrid mode is implemented, hypervisor-A 114A also sends leave request 1170 to leave IP-G to physical network 140. Associated multicast group table 475 is updated to remove an entry associated with IP-A to stop switch 402/406 and/or router 404 from sending multicast traffic addressed to IP-G to hypervisor-A 114A. Note that if hypervisor-C 114C detects leave request 1180 from VM5 135, it is not necessary to inform SDN controller 160 because hypervisor-C 114C should continue to receive multicast packets addressed to IP-M/IP-G on behalf of VM6 136. In this case, leave request 1180 is suppressed. When all hypervisors have left IP-M, SDN controller 160 will release the IP-G mapped to IP-M to a pool. Multicast group table 430 maintained by SDN controller 160 also represents a span table, which is updated as members join or leave the multicast group address.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 11. For example, a computer system capable of acting as host 110A/110B/110C/110D may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a first host to perform multicast packet handling in a software-defined networking (SDN) environment that includes the first host and one or more second hosts residing on a data plane, wherein the method comprises:
   in response to the first host detecting, from a first virtualized computing instance supported by the first host, a request to join a multicast group address,
      sending, to a network management entity residing on a control plane that is separate from the data plane, a request to join the multicast group address to cause the network management entity to inform one or more second hosts of a source virtual tunnel endpoint (VTEP) address associated with the first host; and
      obtaining, from the network management entity, control information that includes one or more destination addresses associated with the one or more second hosts that have joined the multicast group address on behalf of multiple second virtualized computing instances; and
   in response to the first host detecting, from the first virtualized computing instance, an egress multicast packet that includes an inner header addressed to the multicast group address,
      generating one or more encapsulated multicast packets based on the control information, wherein a particular encapsulated multicast packet is generated by encapsulating the egress multicast packet with an outer header addressed from the source VTEP address to a particular destination address; and
      sending the one or more encapsulated multicast packets to the one or more second hosts in a unicast manner or multicast manner, or a combination of both.

2. The method of claim 1, wherein sending the request comprises:
   sending, to the network management entity, the request to join the multicast group address on behalf of the first virtualized computing instance, wherein the request includes the multicast group address, the source VTEP address and an identifier of a logical overlay network on which the first virtualized computing instance is located.

3. The method of claim 1, wherein generating and sending the one or more encapsulated multicast packets comprises:
   based on the control information that includes a first destination VTEP address associated with a particular second host, generating a first encapsulated multicast packet with a first outer header addressed to the first destination VTEP address;
   based on the control information that includes a second destination VTEP address associated with another second host, generating a second encapsulated multicast packet with a second outer header addressed to the second destination VTEP address; and
   sending the first encapsulated multicast packet and the second encapsulated multicast packet in a unicast manner.

4. The method of claim 1, wherein generating and sending the one or more encapsulated multicast packets comprises:
   based on the control information that includes a physical multicast group address associated with the multicast group address, generating one encapsulated multicast packet with the outer header addressed to the physical multicast group address; and
   sending the one encapsulated multicast packet via one or more multicast-enabled network devices that are capable of forwarding the encapsulated multicast packet in a multicast manner.

5. The method of claim 4, wherein the method further comprises:
   generating and sending, to the one or more multicast-enabled network devices, a request to join the physical multicast group address to join the physical multicast group address on behalf of the first virtualized computing instance.

6. The method of claim 1, wherein generating and sending the one or more encapsulated multicast packets comprises:
   based on the control information that includes a physical multicast group address associated with the multicast group address, generating a first encapsulated multicast packet with a first outer header addressed to the physical multicast group address; and
   sending the one encapsulated multicast packet via one or more multicast-enabled network devices that are capable of forwarding the encapsulated multicast packet in a multicast manner.

7. The method of claim 6, wherein generating and sending the one or more encapsulated multicast packets further comprises:
   based on the control information that includes a destination VTEP address that is in a different subnet compared to a source VTEP address associated with the first host, generating a second encapsulated multicast packet with a second outer header addressed to the destination VTEP address or a multicast tunnel endpoint (MTEP) address associated with the different subnet; and
   sending the second encapsulated multicast packet in a unicast manner.

8. A non-transitory computer-readable storage medium that includes a set of instructions which, in response to execution by a processor of a first host, cause the processor to perform a method of performing multicast packet handling in a software-defined networking (SDN) environment that includes the first host and one or more second hosts residing on a data plane, wherein the method comprises:
   in response to the first host detecting, from a first virtualized computing instance supported by the first host, a request to join a multicast group address,
      sending, to a network management entity residing on a control plane that is separate from the data plane, a request to join the multicast group address to cause the network management entity to inform one or more second hosts of a source virtual tunnel endpoint (VTEP) address associated with the first host; and
      obtaining, from the network management entity, control information that includes one or more destination addresses associated with the one or more second hosts that have joined the multicast group address on behalf of multiple second virtualized computing instances; and
   in response to the first host detecting, from the first virtualized computing instance, an egress multicast packet that includes an inner header addressed to the multicast group address,
      generating one or more encapsulated multicast packets based on the control information, wherein a particular encapsulated multicast packet is generated by encapsulating the egress multicast packet with an outer header addressed from the source VTEP address to a particular destination address; and sending the one or more encapsulated multicast packets to the one or more second hosts in a unicast manner or multicast manner, or a combination of both.

9. The non-transitory computer-readable storage medium of claim 8, wherein sending the request comprises:
sending, to the network management entity, the request to join the multicast group address on behalf of the first virtualized computing instance, wherein the request includes the multicast group address, the source VTEP address and an identifier of a logical overlay network on which the first virtualized computing instance is located.

10. The non-transitory computer-readable storage medium of claim 8, wherein generating and sending the one or more encapsulated multicast packets comprises:
based on the control information that includes a first destination VTEP address associated with a particular second host, generating a first encapsulated multicast packet with a first outer header addressed to the first destination VTEP address;
based on the control information that includes a second destination VTEP address associated with another second host, generating a second encapsulated multicast packet with a second outer header addressed to the second destination VTEP address; and
sending the first encapsulated multicast packet and the second encapsulated multicast packet in a unicast manner.

11. The non-transitory computer-readable storage medium of claim 8, wherein generating and sending the one or more encapsulated multicast packets comprises:
based on the control information that includes a physical multicast group address associated with the multicast group address, generating one encapsulated multicast packet with the outer header addressed to the physical multicast group address; and
sending the one encapsulated multicast packet via one or more multicast-enabled network devices that are capable of forwarding the encapsulated multicast packet in a multicast manner.

12. The non-transitory computer-readable storage medium of claim 11, wherein the method further comprises:
generating and sending, to the one or more multicast-enabled network devices, a request to join the physical multicast group address to join the physical multicast group address on behalf of the first virtualized computing instance.

13. The non-transitory computer-readable storage medium of claim 8, wherein generating and sending the one or more encapsulated multicast packets comprises:
based on the control information that includes a physical multicast group address associated with the multicast group address, generating a first encapsulated multicast packet with a first outer header addressed to the physical multicast group address; and
sending the one encapsulated multicast packet via one or more multicast-enabled network devices that are capable of forwarding the encapsulated multicast packet in a multicast manner.

14. The non-transitory computer-readable storage medium of claim 13, wherein generating and sending the one or more encapsulated multicast packets further comprises:
based on the control information that includes a destination VTEP address that is in a different subnet compared to a source VTEP address associated with the first host, generating a second encapsulated multicast packet with a second outer header addressed to the destination VTEP address or a multicast tunnel endpoint (MTEP) address associated with the different subnet; and
sending the second encapsulated multicast packet in a unicast manner.

15. A first host configured to perform multicast packet handling in a software-defined networking (SDN) environment that includes the first host and one or more second hosts residing on a data plane, wherein the first host comprises:
a processor; and
a non-transitory computer-readable medium having stored thereon instructions for a first hypervisor that, in response to execution by the processor, cause the first hypervisor to:
in response to the first host detecting, from a first virtualized computing instance supported by the first host, a request to join a multicast group address,
send, to a network management entity residing on a control plane that is separate from the data plane, a request to join the multicast group address to cause the network management entity to inform one or more second hosts of a source virtual tunnel endpoint (VTEP) address associated with the first host; and
obtain, from the network management entity, control information that includes one or more destination addresses associated with the one or more second hosts that have joined the multicast group address on behalf of multiple second virtualized computing instances; and
in response to the first host detecting, from the first virtualized computing instance, an egress multicast packet that includes an inner header addressed to the multicast group address,
generate one or more encapsulated multicast packets based on the control information, wherein a particular encapsulated multicast packet is generated by encapsulating the egress multicast packet with an outer header addressed from the source VTEP address to a particular destination address; and
send the one or more encapsulated multicast packets to the one or more second hosts in a unicast manner or multicast manner, or a combination of both.

16. The first host of claim 15, wherein the instructions for sending the request cause the first hypervisor to:
send, to the network management entity, the request to join the multicast group address on behalf of the first virtualized computing instance, wherein the request includes the multicast group address, the source VTEP address and an identifier of a logical overlay network on which the first virtualized computing instance is located.

17. The first host of claim 15, wherein the instructions for generating and sending the one or more encapsulated multicast packets cause the first hypervisor to:
based on the control information that includes a first destination VTEP address associated with a particular second host, generate a first encapsulated multicast packet with a first outer header addressed to the first destination VTEP address;
based on the control information that includes a second destination VTEP address associated with another second host, generate a second encapsulated multicast packet with a second outer header addressed to the second destination VTEP address; and
send the first encapsulated multicast packet and the second encapsulated multicast packet in a unicast manner.

18. The first host of claim 15, wherein the instructions for generating and sending the one or more encapsulated multicast packets cause the first hypervisor to:
- based on the control information that includes a physical multicast group address associated with the multicast group address, generate one encapsulated multicast packet with the outer header addressed to the physical multicast group address; and
- send the one encapsulated multicast packet via one or more multicast-enabled network devices that are capable of forwarding the encapsulated multicast packet in a multicast manner.

19. The first host of claim 18, wherein the instructions further cause the first hypervisor to:
- generate and send, to the one or more multicast-enabled network devices, a request to join the physical multicast group address to join the physical multicast group address on behalf of the first virtualized computing instance.

20. The first host of claim 15, wherein the instructions for generating and sending the one or more encapsulated multicast packets cause the first hypervisor to:
- based on the control information that includes a physical multicast group address associated with the multicast group address, generate a first encapsulated multicast packet with a first outer header addressed to the physical multicast group address; and
- send the one encapsulated multicast packet via one or more multicast-enabled network devices that are capable of forwarding the encapsulated multicast packet in a multicast manner.

21. The first host of claim 20, wherein the instructions for generating and sending the one or more encapsulated multicast packets cause the first hypervisor to:
- based on the control information that includes a destination VTEP address that is in a different subnet compared to a source VTEP address associated with the first host, generate a second encapsulated multicast packet with a second outer header addressed to the destination VTEP address or a multicast tunnel endpoint (MTEP) address associated with the different subnet; and
- send the second encapsulated multicast packet in a unicast manner.

* * * * *